UNITED STATES PATENT OFFICE.

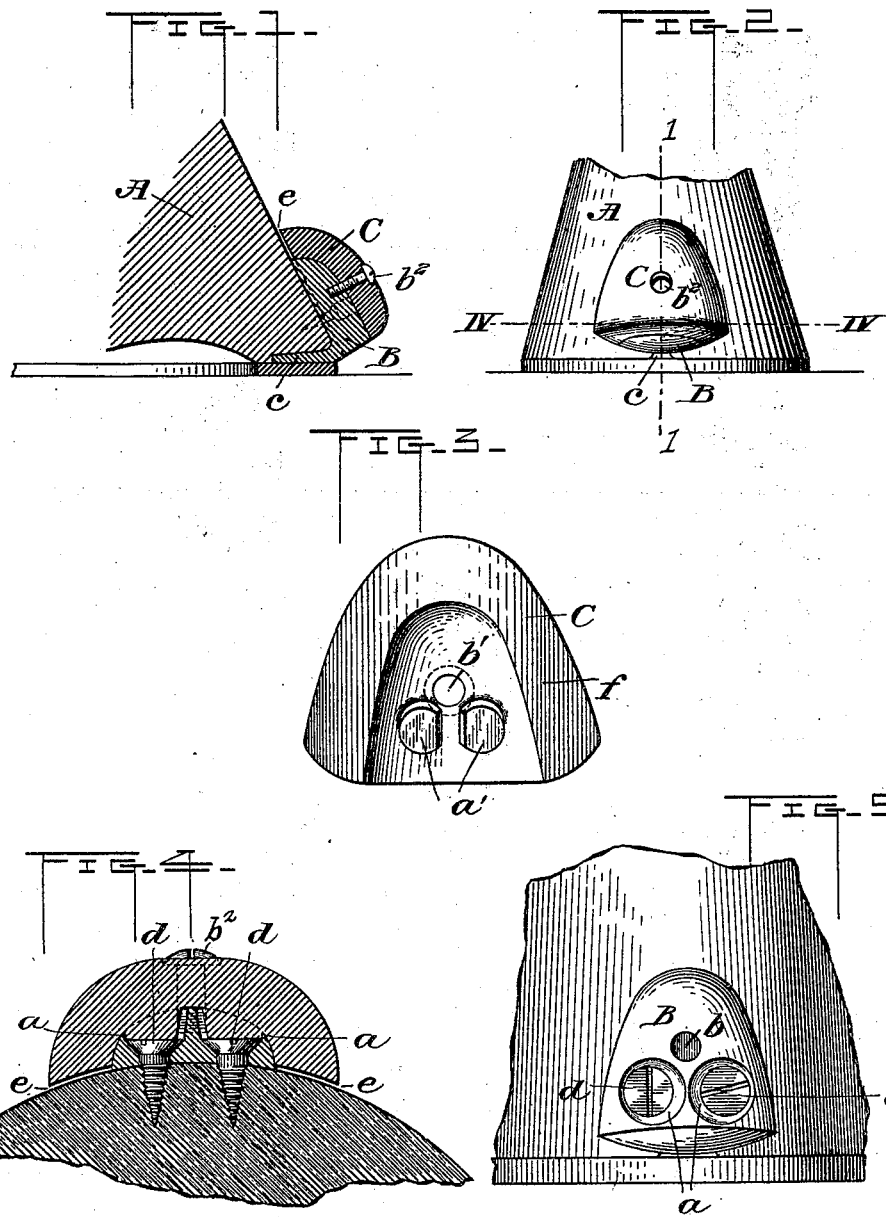

JAMES DAVID KELLER, OF DETROIT, MICHIGAN, ASSIGNOR OF ONE-HALF TO JOHN F. SHIEL, OF SEYMOUR, INDIANA.

TOE-WEIGHT.

SPECIFICATION forming part of Letters Patent No. 503,089, dated August 8, 1893.

Application filed April 25, 1893. Serial No. 471,817. (No model.)

*To all whom it may concern:*

Be it known that I, JAMES DAVID KELLER, a citizen of the United States, residing at Detroit, in the county of Wayne and State of Michigan, have invented certain new and useful Improvements in Toe-Weights for Horses; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to toe-weights regularly used for balancing trotting and pacing horses and its object is to secure readily interchangeable weights which will not become loosened by the motion of the horse, and in which concussion with the hoof is avoided. These ends I accomplish by the construction and novel combination and arrangement of parts hereinafter fully described, and illustrated by the accompanying drawings, in which—

Figure 1 is a vertical section on the line 1—1 of Fig. 2 from front to rear of a hoof with my weight attached. Fig. 2 is a perspective view of the weight attached to a hoof. Fig. 3 is a rear elevation of the detachable portion of the weight. Fig. 4 is a horizontal section of the weight cut through the line IV—IV of Fig. 2. Fig. 5 is a perspective view of that part of the weight which remains fastened to the hoof.

Referring to the drawings in detail A represents a horse's hoof, B that part of my weight which is permanently fixed to the hoof, and C the detachable portion of the weight. The fixed part, or base B is substantially an oval-segment with its rear surface concaved to fit the convex surface of a horse's hoof. In order to secure the desired bulk it is preferably a perfect two ounce weight, the shoe being reduced to compensate for this additional weight. This part of my weight may however be made of some light and substantial material such as aluminum, when its weight becomes a matter of no consideration.

In the thickest part of the base B are sunk the recesses $a$ having screw-holes at their lower extremities, through which the screws $d$ are inserted for attaching it permanently to the hoof. B is also provided with a threaded screw-hole $b$ for the reception of the screw $b^2$ by which the removable shell C is attached to it. The screw-hole $b$ is situated slightly above the recesses $a$ and over their point of nearest approach, thus forming a triangle with them. From the center of the lower part of the base B the spur $c$, integral with the base, extends backward. A channel is cut in the center of the bottom of the hoof for the admission of the spur $c$ which, resting upon the shoe and fitting snugly in the channel prevents the motion which ordinarily loosens the screws in the sudden jars occurring when the hoof is raised from or strikes the ground. By the insertion of the spur $c$ as stated a triangular brace is formed with the screws $d\,d$ and play in every direction is overcome, so that the screws cannot work loose in the hoof.

The shell C or detachable part of my weight has an exterior surface of the ordinary pear shape. About the center of C is a screw-hole $b'$ through which the screw $b^2$ passes into the screw-hole $b$ fastening the shell to the base. The shell C may be as heavy as desired, and its weight may be, and preferably is, regularly distributed throughout the entire body. In the back of the shell C is a concave depression so constructed as to closely embrace the convex front of the base B and broken only by the two projections $a'$ adapted to perfectly fit and fill the recesses $a$ of the base B. The shell C is so constructed that when applied to the base B its rear surface $f$ is not flush with the rear surface of B, but is held a minute distance from the hoof, as shown at $e$ in Figs. 1 and 4. This construction overcomes one of the most serious difficulties encountered in the use of toe-weights, the concussion of the weight with the hoof, which causes the hoof to become sore and tender and often produces serious lameness.

A second great drawback, heretofore existing in toe-weights easily interchangeable, was the tendency to become worn and loosened by use. This is overcome by the shape of the base of my weight in connection with the device of triangular fastenings or braces. The triangular brace by which the base is secured to the hoof has been pointed out. The second triangle is formed by the projections $a'$ extending from the under surface of the shell C into the recesses $a$ of the base B, and the screw extending through the hole $b'$ of the shell into the screw-hole $b$ of the base. This triangular fastening upon the convex base closely embraced by the concavity of the shell prevents all motion which would act laterally upon the screw $b^2$ and all wearing of or by it is overcome.

Having thus described my invention, what I claim as new, and desire to secure by Letters Patent, is—

A toe-weight for horses consisting of a semi-oval base provided with a screw-hole near its center, and a spur extending to the rear from the center of its lower edge, each triangularly situated with reference to recesses sunk near the lower edge of the base and having screw-holes at their lower extremities, and a detachable shell having a cavity in its rear side made to closely embrace the base and provided with projections extending from such cavity and adapted to fit the recesses of the base, and having a screw-hole through which a screw passes into the screw-hole near the center of the base, substantially as described and for the purposes specified.

In testimony whereof I affix my signature in presence of two witnesses.

JAMES DAVID KELLER.

Witnesses:
DUNCAN J. LAMONT,
COLVIN LAMONT.